May 22, 1962
A. E. ALDEN
3,035,488
APPARATUS FOR COMPENSATING FOR RESIDUAL
CHROMATIC ABERRATION
Filed Nov. 29, 1956
3 Sheets-Sheet 1
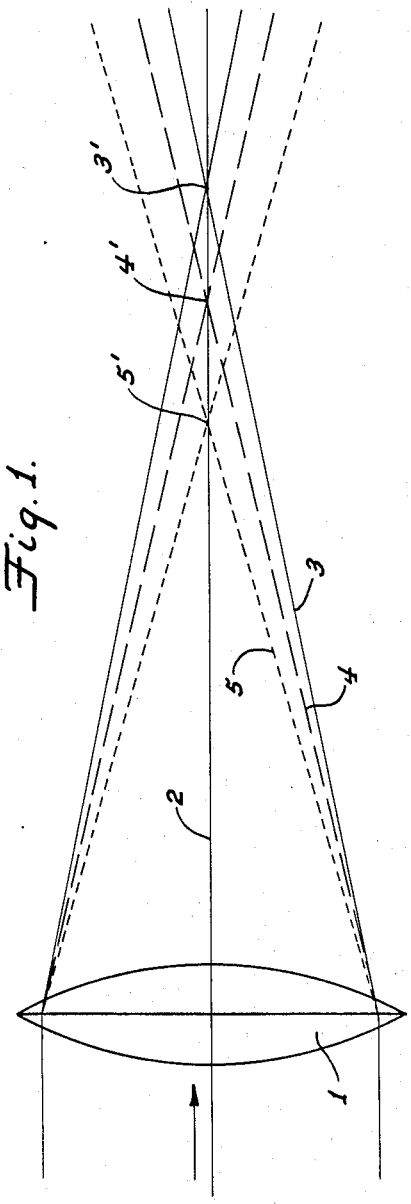
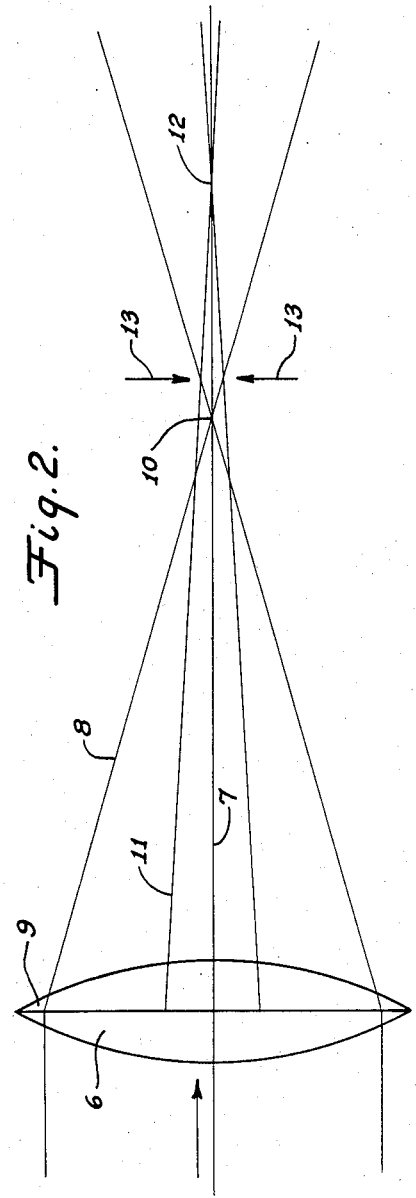
INVENTOR.
ALEX EUGENE ALDEN
BY
ATTORNEY

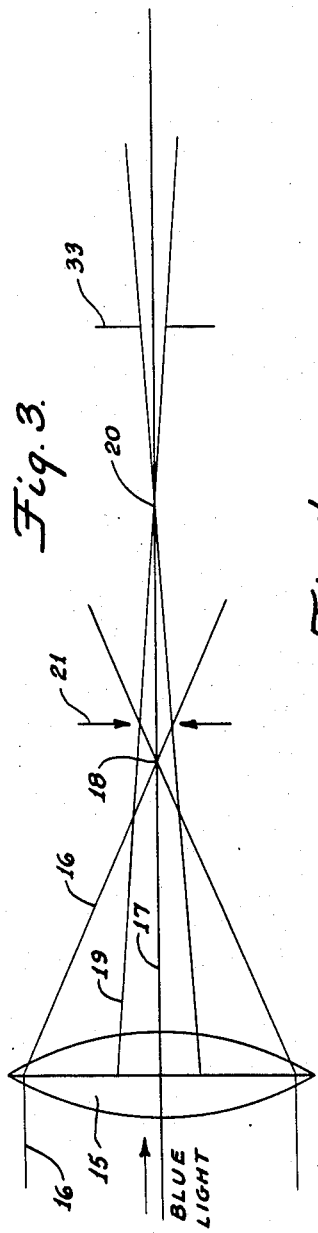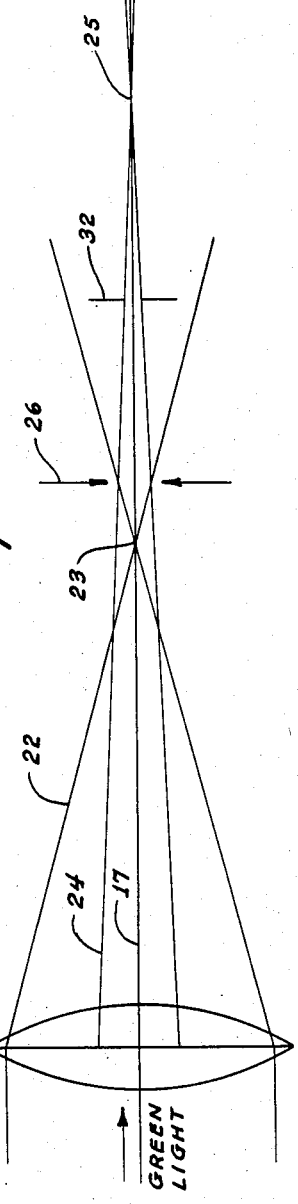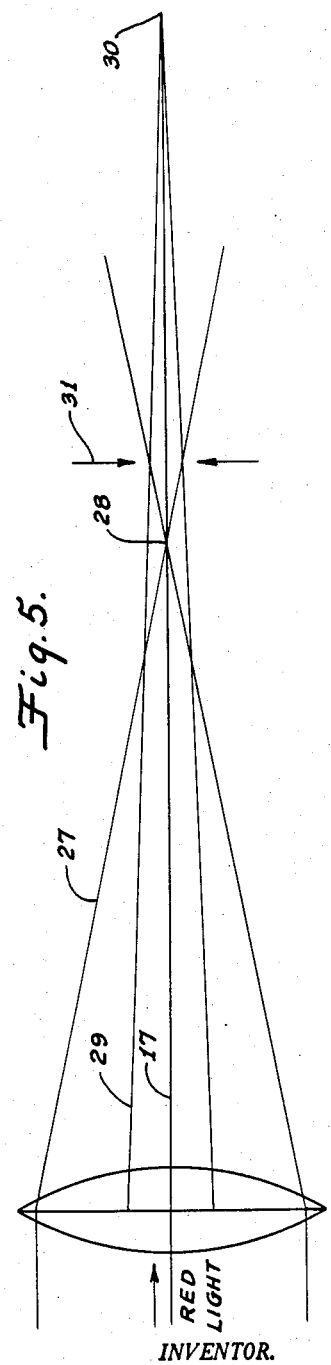

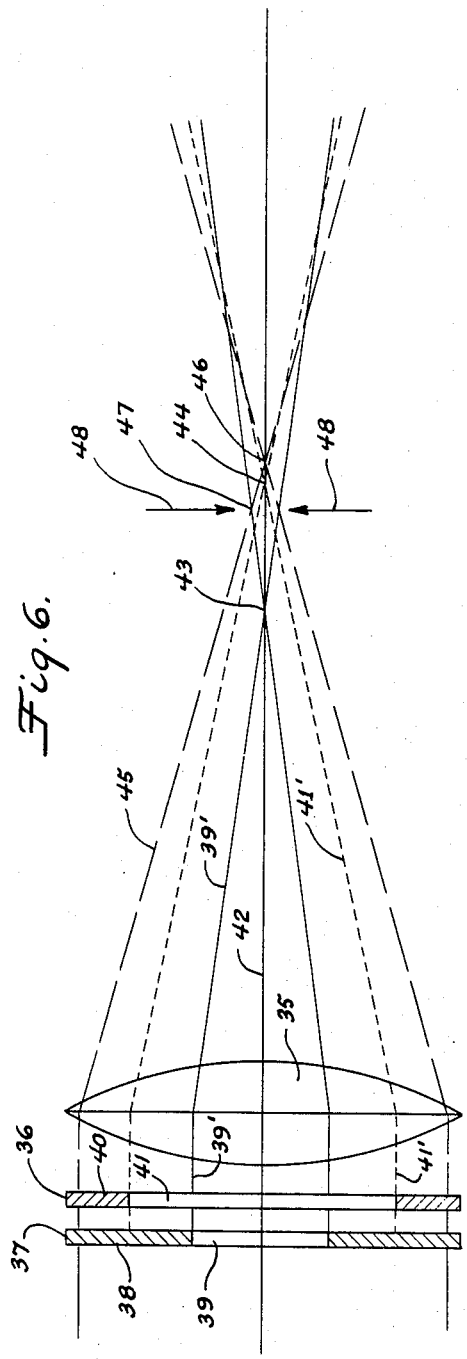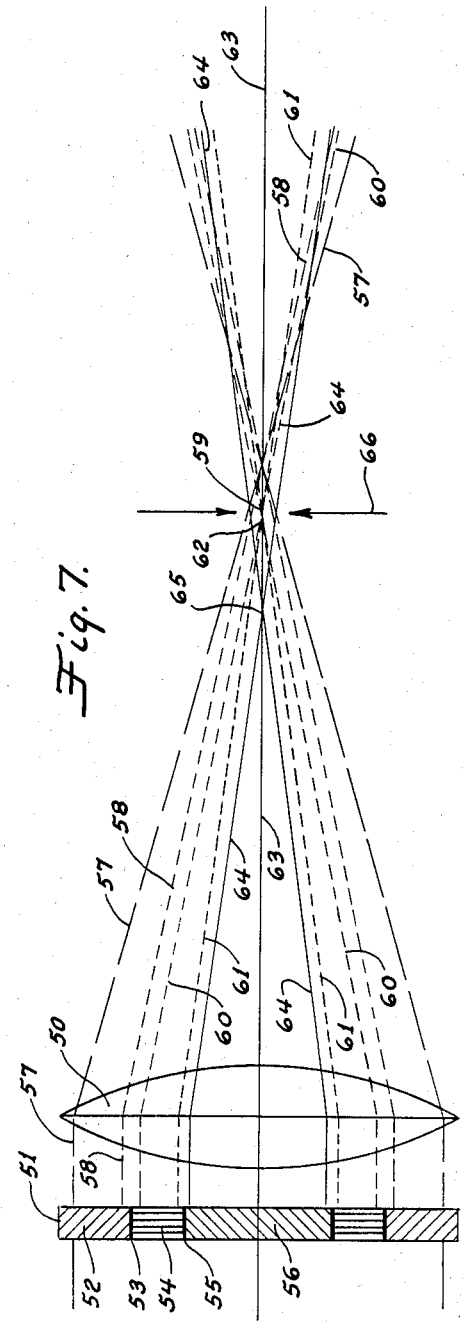
INVENTOR.
ALEX EUGENE ALDEN

United States Patent Office 3,035,488
Patented May 22, 1962

3,035,488
APPARATUS FOR COMPENSATING FOR RESIDUAL CHROMATIC ABERRATION
Alex Eugene Alden, Stamford, Conn., assignor to Twentieth Century-Fox Film Corporation, New York, N.Y., a corporation of New York
Filed Nov. 29, 1956, Ser. No. 625,122
3 Claims. (Cl. 88—57)

This invention relates to optical systems and is particularly concerned with compensation of such systems for defects due to residual chromatic aberration.

In optical systems for the forming of high quality images, the improvements that have been incorporated in the lenses employed produce or leave observable defects in the projected images, resulting from residual chromatism. Inasmuch as the focal point of the different colors cannot be made to coincide or fall at the same point, as is inherent in a lens suffering from chromatism, the size and shape of the resultant images will be, by nature, different, color to color. This overall effect can be seen as color fringes. Means employed to correct for this involving present techniques appear to have reached their limit. For further improvement it appears that it will be necessary to have recourse to supplemental means.

It has been found, in accordance with this invention, that a substantial step forward can be taken now by compensating for chromatic aberration with a supplementary means. Stated differently, it has been found that the size of the various color images can be adjusted accurately to a desired size to cause, or effect, a change in the fringe effect of the projected image, thus achieving a cleaner, sharper image of higher definition.

More particularly the invention is based upon the concept that by the proper positioning and choice of stops in optical systems it is possible to compensate for the effect of chromatic aberration. This is achieved in accordance with the invention by limiting the various zones and areas of a lens to certain color bands and doing so by diaphragm devices of various types, whether for stopping all light or merely effecting a color filtering function. Putting it another way, the invention is based on recognition of the fact that it is not necessary to employ an optical system using a single aperture which is so dimensioned, or positioned, for all colors but rather that different apertures may be employed for different colors. In this way the invention provides a variable to use, which has not heretofore been appreciated.

It is, accordingly, a principal object of the invention to compensate for the residual chromatism of a lens by selectively controlling each of the colors in the light passing through the lens.

Another object is to provide apparatus for effecting such compensation.

Another object is to provide for such compensation by controlling the portions of the lens through which the different colors pass.

Still another object is to provide an optical system involving an image forming lens with means supplemental to the lens for compensating the residual chromatism of the same.

A further object is to provide for such compensation by the selective stopping of the color components of the light to pass through the lens.

A still further object is to provide for such stopping by the selective filtering of certain of the color components.

Further and more detailed objects will in part be obvious and in part be pointed out as the description of the invention, taken in conjunction with the accompanying drawing, proceeds, in which drawing:

FIG. 1 is a ray diagram illustrating the typical effect of chromatic aberration in a simple lens.

FIG. 2 is a similar view illustrating the effect of spherical aberration in a simple lens.

FIGS. 3, 4 and 5 are similar views illustrating the combined action of chromatic aberration and spherical aberration for each of the three primary colors.

FIG. 6 is a diagrammatic view combined with a ray diagram illustrating one manner in accordance with the invention for selectively limiting certain of the color components of the light to certain areas of the lens; and FIG. 7 is a similar view illustrating another manner of selectively directing the component colors of the light through desired areas of the lens.

As illustrated in FIG. 1, an image forming lens, in about its most simple form is shown at 1. This lens may be such as is used for the projection of still, or motion pictures, or such as is employed in microscopes, telescopes or other image forming optical devices. The showing of a simple lens here is purely for the purpose of illustration, it being understood that the principles of the invention are equally applicable to lenses formed of a combination of lens elements so long as they serve to form an image.

The lens 1 is shown as being unable to bring to a common focus light waves of varying wave lengths. The light of longer wave lengths is shown as focused further from the lens, while that of the shorter wave lengths is focused nearer the lens. Thus, in the FIG. 1 wherein the axis of the lens is indicated at 2, the longer wave length red light as illustrated by the full line 3, is brought to focus at the position 3'. The next shorter green light, shown in dash lines 4, is brought to focus at the point 4', while the shortest wave length blue light illustrated in the dotted line 5, is brought to focus at the point 5'. The focal points 3', 4', 5' are shown as lying on the axis 2 of the lens, since the invention can be adequately illustrated by basing the illustration on the inability of the lens to focus different wave length light at the same position along the axis.

In FIG. 2, the effect of spherical aberration is illustrated for monochromatic light passing through a simple image forming lens 6. Here the axis of the lens is illustrated at 7 and since the light is all of the same color, the ray patterns are indicated by solid lines. What is clearly seen is that due to the spherical aberration, the rays such as shown at 8, passing through the marginal area 9 of the lens focus at the position 10 on the axis 7, while the axial rays, as illustrated at 11, focus further away from the lens at the position 12. There is a plane, however, across the projected beam where the cross section of the beam is smallest. This is known as the circle of least confusion, or the point of focus, and is designated by means of the arrows 13 which show the plane and an area of the beam at that position.

The combined action of chromatic and spherical aberration with respect to primary color components of light is separately illustrated in FIGS. 3, 4 and 5. Assuming that the same lens 15 is used in each instance, blue light passing through the lens will have its marginal rays 16 brought to focus on the axis at the position 18. The circle of least confusion will be close in toward the lens at the position designated by the arrows 21. With regard to the green light, as illustrated in FIG. 4, the lens 15 will bend the marginal rays 22 in to a lesser extent so that they will focus on the axis at the point 23 while the axial rays 24 focus a considerable distance further out on the axis at the position 25. Here the circle of least confusion designated by the arrows 26 is further out from the lens than is the case in FIG. 3.

In FIG. 5, red light, having the longest wave length has the rays 27 passing through the marginal portion of the lens brought to focus at the position 28 while the axial rays 29 are brought to focus at the position 30 with the circle of least confusion well out from the lens at the position 31.

In viewing the patterns of FIGS. 3, 4 and 5 in alignment, however, it is discovered that there is a position where a common plane passing through the ray patterns for all of the colors establishes circles which are of substantially the same size. This plane, in this instance, happens to be substantially at the position of the circle of least confusion 31. This is the plane at which the composite image formed by the superimposed images of the three primary colors is more clearly defined because of the lack of color fringing normally caused by images varying in size from color to color. Thus it is seen that the position 32, where the plane crosses the ray path for the green light of FIG. 4, the area occupied by the converging axial rays is substantially the same as that of the circle of least confusion in FIG. 5. Similarly, when the plane passes through the ray pattern in FIG. 3, as illustrated at 33, the circular area within the diverging axial rays is also substantially the same.

Having visualized this factor and having recognized how it could be utilized in adjusting the unlike sizes or magnifications of the primary color images, the invention is concerned with manners for putting it to use. This can be done in a variety of ways, two of which are illustrated in FIGS. 6 and 7. In the FIG. 6 showing an image forming lens is illustrated at 35 with annular filters 36 and 37 suitably positioned in accordance with proper optical principles at the side thereof toward the object to be imaged, which object will be understood to be illuminated by light in full color.

The object of these filters is to limit the portion of the lens through which certain of the rays, or bundles of rays, may pass. More specifically, the rays of the short wave lengths are limited in their path to the axial portion of the lens, while those of longer wave length are permitted to pass through more of the lens from the axis outwardly, etc., leaving the full height of the lens for passage of the long wave length red rays. Hence the filter 37 has the larger annular band 38 and the small central opening 39. The band 38, being a yellow filter, filters out the blue light limiting it to the desired F value indicated by the opening 39. The red and green light, however, pass through the band 38 to the band 40 of the filter 36. The band 40 is another annular filter having an opening 41 therethrough substantially larger than the opening 39. The band 40 being a magenta filter thus subtracts the green light but passes the red. The green light is, accordingly, stopped down to the opening 41 whereas the red light passes through the full height of the lens.

Turning to the ray pattern resulting, it will be seen that the rays of blue light 39', shown in a full line, restricted by the stop 39, pass through the portion of the lens closest to the axis and are bent to converge and cross the axis 42 at the position 43 from which they diverge again. The next wider light band is that of the green light whose rays 41', illustrated as a dotted line, pass through the opening 41, are bent by the lens to converge along the lines 41' and are brought to focus on the axis 42 at the position 44. Finally, the red rays 45, illustrated by dash lines, being of the longest wave length, are least affected by the chromatic and spherical aberrations of the lens so are brought to focus at 46 a little further out on the axis than the focus position 44 of the green light.

It will be seen from the showing that at the position 47 where the diverging blue rays 39 and the converged red rays 45 intersect, the cone formed by the green rays 41 will have substantially the same cross-sectional area in respect to a plane passed through the intersection at right angles to the axis. Thus this establishes a circle of least confusion for all of the three colors which is substantially at the same cross sectional area for all of the colors. This is designated by the arrows 48. Hence at this position the defects introduced by residual chromatic and spherical aberration are substantially compensated for and an image of higher quality than heretofore thought possible is created. This, of course, requires that the size, position and nature of the filter bands be properly determined for the particular lens in accordance with known optical principles.

The achievement of the result of the invention in an additive manner is illustrated in FIG. 7. Here the lens 50 again has a filter 51 properly positioned with respect to it, having regard to the characteristics of the particular lens. This filter is here shown as a composite of annular bands for the selective passage of the various colors of light coming from the full color object. The largest of these filters, lying in opposition to the marginal portion of the lens, is red filter 52 which passes only red light. The inner periphery of this annulus is bordered by an opaque spacer ring 53 inwardly of which is positioned the annular green filter 54 for passing only green light. The inner perimeter of the annulus 54 again has an opaque spacer ring 55 separating it from the center blue filter 56 which passes only short wave length blue light.

The band of red light accordingly lies between the dash lines 57—58, with the outer extremity 57 being brought to focus at substantially the position 59 just ahead of the position where the band 58 comes to focus. Next the outer band 60 of the green light, whose zone is denoted by the dotted lines 60—61 is brought to focus at the position 62 slightly inwardly from the position 59 which, again, is inwardly of the position where the inner border 61 crosses the axis 63.

The blue light passing through the filter 56, whose borders are shown in the solid lines 64, is restricted so that, as here shown, it intersects the axis 63 at the position 65 and diverges therefrom. Thus there is a position closely adjacent the points where the outer rays of the red and green cones intersect the axis where light bands of the respective colors all have substantially the same cross sectional area with respect to a plane passed at right angles to the axis. This circle of least confusion is designated by the arrows 66 and as in the FIG. 6 situation is the area where the image is least affected by the residual chromatic and spherical aberrations of the lens.

Though certain filter arrangements have been shown for achieving the result of the invention, it is to be understood that such result can be achieved by modifications or variations of the arrangements shown, so long as they are properly related to the lens. Furthermore, instead of using filters, the effect of the invention can be achieved by employing positive stops imparting different F values to different areas of the lens. Speaking more generally, while in the foregoing description various elements have been specified as being effective for the intended purpose, it is of course to be understood that such references are for illustrative and not limiting purposes and that the scope of the invention embraces the use of such elements as are suitable for the ends to be achieved. It is further to be understood that since certain changes may be made in the system set forth and in carrying out the method of the invention and since different embodiments of the invention may be made without departing from the scope of the invention, it is intended that all material contained in the above description or shown in the accompanying drawing shall be interpreted as illustrative and not in a limiting sense.

Having described my invention, what I claim as new and desire to secure by Letters Patent is:

1. An optical system for compensating for the defects due to residual chromatism of an image forming lens, which comprises in combination, an image forming lens and a color filter system for forming an image behind said lens of an object in front of said lens and color filter system, the system being arranged to produce, in a common plane, an image having a substantially common circle of least confusion for light of each wavelength, said color filter system being positioned in front of said lens and including a plurality of color filters for filtering out light of different wave lengths, passage means formed through said color filter system for passing light of the shortest wave length to the central portion of said lens about the axis thereof to form a first image including said shortest wave length light at said common image plane behind said lens, an intermediate color filter bordering said passage means for preventing passage of light of the shortest wave length and for directing the passage of light of intermediate wave length to a concentric portion of said lens surrounding said central portion but being less than the remainder of said lens to form a second image at said common plane by said intermediate wave length light, said second image being substantially superimposed upon and of substantially the same size as said first image, a surrounding color filter overlying the remainder of said lens for preventing the passage of all light but that of the longest wave length and providing for passage of light of said longest wave length to form a third image at said common plane substantially superimposed upon and of substantially the same size as said first and second images, the axial position of said filters with respect to said lens and the radial extent of said filters and said passage forming means at the central portion of said lens being so dimensioned that the portions of said lens through which light of the respective wave lengths pass will focus substantially at said common plane where images for each of said wave lengths of substantially the same size and of substantial sharpness will be formed, thereby providing a common circle of least confusion at said common plane for light of each of said wave lengths.

2. An optical system for compensating for the defects due to residual chromatism of an image forming lens, which comprises in combination, an image forming lens and a color filter system for forming an image behind said lens of an object in front of said lens and color filter system, the system being arranged to produce, in a common plane, an image having a substantially common circle of least confusion for light of each wavelength, said color filter system being positioned in front of said lens and including a plurality of color filters for filtering out light of different wave lengths, passage means formed through said color filter system for passing light of all wave lengths including the shortest wave length to the central portion of said lens about the axis thereof to form a first image including said shortest wave length light at said common image plane behind said lens, an intermediate color filter bordering said passage means for preventing passage of light of the shortest wave length and for directing the passage of light of all other wave lengths including that of intermediate wave length to a concentric portion of said lens surrounding said central portion but being less than the remainder of said lens to form a second image at said common plane by said intermediate wave length light, said second image being substantially superimposed upon and of substantially the same size as said first image, a surrounding color filter overlying the remainder of said lens for preventing the passage of all light but that of the longest wave length and providing for passage of light of said longest wave length to form a third image at said common plane substantially superimposed upon and of substantially the same size as said first and second images, the axial position of said filters with respect to said lens and the radial extent of said filters and said passage forming means at the central portion of said lens being so dimensioned that the portions of said lens through which light of the respective wave lengths pass will focus substantially at said common plane where images for each of said wave lengths of substantially the same size and of substantial sharpness will be formed, thereby providing a common circle of least confusion at said common plane for light of each of said wave lengths.

3. An optical system as in claim 1 wherein said light of shortest wave length is blue, said light of intermediate wave length is green and said light of longest wave length is red.

References Cited in the file of this patent

UNITED STATES PATENTS

| | | |
|---|---|---|
| 934,579 | Straubel et al. | Sept. 21, 1909 |
| 1,370,885 | Frederick et al. | Mar. 8, 1921 |
| 1,494,373 | Power | May 20, 1924 |
| 1,556,982 | Weidert | Oct. 13, 1925 |
| 1,613,562 | Frost | Jan. 4, 1927 |
| 1,626,841 | Kelley et al. | May 3, 1927 |
| 1,637,917 | Richter | Aug. 2, 1927 |
| 1,746,584 | Fournier | Feb. 11, 1930 |
| 1,943,521 | Ewald | Jan. 16, 1934 |
| 2,009,145 | Nathan | July 23, 1935 |
| 2,059,361 | Kenworthy | Nov. 3, 1936 |
| 2,207,411 | Pierce | July 9, 1940 |
| 2,216,965 | Sukumlyn | Oct. 8, 1940 |
| 2,284,567 | French | May 26, 1942 |
| 2,385,770 | Birch-Field | Oct. 2, 1945 |
| 2,506,037 | Roelofs | May 2, 1950 |
| 2,519,428 | Birch-Field | Aug. 22, 1950 |
| 2,777,364 | Murray | Jan. 15, 1957 |

FOREIGN PATENTS

| | | |
|---|---|---|
| 158,287 | Australia | Aug. 17, 1954 |